UNITED STATES PATENT OFFICE.

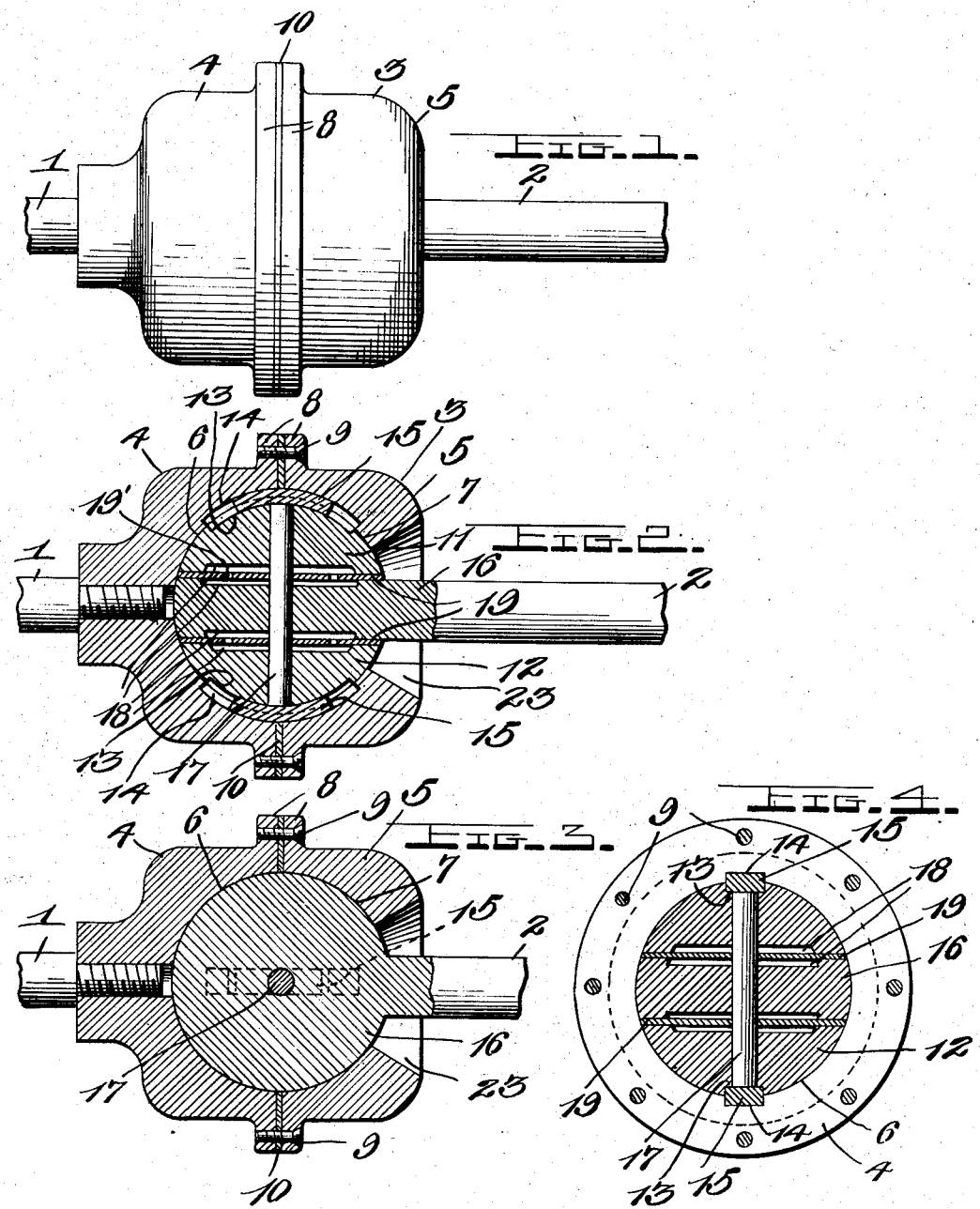

TUBLE J. HUDSON, OF WYATT, LOUISIANA.

SHAFT-COUPLING.

1,047,811.  Specification of Letters Patent.  Patented Dec. 17, 1912.

Application filed March 30, 1912. Serial No. 687,410.

*To all whom it may concern:*

Be it known that I, TUBLE J. HUDSON, a citizen of the United States, residing at Wyatt, in the parish of Jackson and State of Louisiana, have invented certain new and useful Improvements in Shaft-Couplings, of which the following is a specification, reference being had to the accompanying drawings.

This invention relates to new and useful improvements in shaft couplers and universal joints which are employed for connecting together two shafts or other rotatable power transmitting members which are arranged either in alinement or at an angle to each other.

The object of the present invention is to simplify the construction of shaft couplers of the character indicated and to provide a coupling wherein there is a continuous central working of the various operating parts.

Another object of the invention is to provide a device of this character which will possess advantages in points of efficiency and durability, is inexpensive of manufacture and at the same time simple in construction and operation.

With the above and other objects in view the invention consists in the novel features of construction and in the combination and arrangement of parts hereinafter more fully described, pointed out in the claim, and shown in the accompanying drawings, in which, Figure 1 is a side elevation of my improved coupling; Fig. 2 is a vertical sectional view; Fig. 3 is a horizontal sectional view; Fig. 4 is a transverse sectional view.

Referring more particularly to the drawings, 1 and 2 represent respectively the adjacent ends of two shafts for power transmitting members designed to be coupled together by my improved coupling. The coupling comprises a casing 2 which is divided into two halves 4 and 5, each having a semispherical cavity 6 and 7 respectively formed therein, and arranged at diametrically opposite points and are divided by the division line between the halves of the casing, so that the parts of the coupling may be readily assembled or taken apart as will appear presently. The halves of the casing are provided with an annular flange 8 whereby the halves of the casing may be securely fastened together by means of the screw bolts 9, the washer 10 being arranged between the halves of the casing. Arranged on the interior of the casing are the semispherical bearing members 11 and 12 of a size that they fit closely within the casing and engage the inner spherical surface of the latter. The spherical surface of each of the bearing members is provided with a groove 13 adapted for the reception of the arc shaped keys 15, the outer surfaces of which are arranged within the grooves 14 of the casing. The inner end of the shaft 2 is provided with an enlarged circular head 16 adapted to be disposed between the flat surfaces of the bearing members 11 and 12 and is pivotally secured therebetween by means of the pin 17 passing through the bearing members and through the head 16. Recesses 18 are formed in the flat surfaces of the bearing members upon each side of the head 16 adapted for the reception of a lubricant. Antifrictional bearing plates 19 are arranged between the head 16 and the flat surfaces of the bearing members 11 and 12, said plates being provided with a plurality of openings 19' adapted for the passage of the lubricant so that the bearing surfaces of the members 11 and 12 and the head 16 will be thoroughly lubricated.

It is to be understood that the grooves 13 and 14 are to be of sufficient length to allow the shaft 2 to swing to an angle of about 45 degrees, said shaft being adapted to swing in any desired direction, the enlarged opening 23 in the section 5 of the casing allowing the shaft to swing in any desired direction.

While I have shown and described the recesses 18 as the preferred form for applying lubricant to the coupling, it will be understood that the coupling may be lubricated in any suitable manner.

From the above description taken in connection with the drawings it will be readily apparent that I have provided a simple and durable coupling whereby two shafts or other rotatable power transmitting members which may be arranged either in alinement or at an angle to each other will be suitably connected together.

While I have shown and described the preferred forms of my invention it will be obvious that various changes in the details of construction and in the proportions may be resorted to for successfully carrying my invention into practice without sacrificing any of the novel features or departing from the scope thereof.

What I claim is:—

In a universal joint, the combination of a sectional casing, having an interior spherical surface, the interior of said casing being provided with arc shaped grooves arranged at diametrically-opposite points, a shaft secured to one end of the casing, semi-circular bearing members arranged within the casing having a groove formed in the outer surface of each of said members, keys arranged within the grooves and having their outer surface disposed within the grooves of the casing, a second shaft having an enlarged circular end adapted to be movably secured between the inner surfaces of the bearing members, each face of the enlarged end of the shaft and each of the inner faces of the bearing members being provided with a recess adapted for the reception of a lubricant, and bearing plates arranged between the bearing members and each face of the enlarged end of the shaft, having a plurality of openings formed therein to allow the circulation of the lubricant.

In testimony whereof I hereunto affix my signature in the presence of two witnesses.

TUBLE J. HUDSON.

Witnesses:
W. J. WYATT,
H. E. CONNOR.